United States Patent
Guido et al.

(10) Patent No.: US 7,617,233 B2
(45) Date of Patent: Nov. 10, 2009

(54) METHOD, SYSTEM, AND COMPUTER PROGRAM PRODUCT FOR SHARING INFORMATION BETWEEN HYPERTEXT MARKUP LANGUAGE (HTML) FORMS USING A COOKIE

(75) Inventors: Patrick R. Guido, Cary, NC (US); Robert C. Leah, Cary, NC (US); Paul F. McMahan, Apex, NC (US); Wayne B. Riley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 10/952,120

(22) Filed: Sep. 28, 2004

(65) Prior Publication Data

US 2006/0075330 A1 Apr. 6, 2006

(51) Int. Cl.
G06F 17/30 (2006.01)

(52) U.S. Cl. .................. 707/102; 707/101; 709/203; 709/218; 709/224; 709/229; 715/700; 725/87; 370/353; 370/465

(58) Field of Classification Search ................ 707/200, 707/205, 10, 9, 101, 102; 710/260; 715/200, 715/700; 709/217, 218, 219, 201, 223, 224, 709/203, 228; 725/87; 370/353, 465
See application file for complete search history.

(56) References Cited

U.S. PATENT DOCUMENTS

| | | | |
|---|---|---|---|
| 6,006,260 A * | 12/1999 | Barrick et al. ............... 709/224 |
| 6,589,290 B1 * | 7/2003 | Maxwell et al. ............. 715/507 |
| 6,651,217 B1 * | 11/2003 | Kennedy et al. ............ 715/507 |
| 6,662,340 B2 | 12/2003 | Rawat et al. |
| 7,003,550 B1 * | 2/2006 | Cleasby et al. .............. 709/205 |
| 7,076,504 B1 * | 7/2006 | Handel et al. ............ 707/104.1 |
| 7,216,292 B1 * | 5/2007 | Snapper et al. ............. 715/236 |
| 2002/0007317 A1 * | 1/2002 | Callaghan et al. ............ 705/26 |
| 2002/0120628 A1 * | 8/2002 | Hitchcock et al. ........... 707/100 |
| 2002/0165877 A1 | 11/2002 | Malcolm et al. |
| 2003/0028792 A1 | 2/2003 | Plow et al. |
| 2003/0188262 A1 | 10/2003 | Maxwell et al. |
| 2003/0220901 A1 * | 11/2003 | Carr et al. ...................... 707/1 |
| 2004/0030991 A1 * | 2/2004 | Hepworth et al. ........... 715/507 |
| 2005/0028082 A1 * | 2/2005 | Topalov et al. .............. 715/505 |
| 2005/0209903 A1 * | 9/2005 | Hunter et al. .................. 705/9 |

FOREIGN PATENT DOCUMENTS

AU 200057770 A * 1/2001

* cited by examiner

*Primary Examiner*—Hosain T Alam
*Assistant Examiner*—Syling Yen
(74) *Attorney, Agent, or Firm*—Hoffman Warnick LLC

(57) ABSTRACT

The present invention provides a method, system, and computer program product for automatically sharing information between HTML forms using a cookie. A method in accordance with the present invention comprises: providing a cookie containing at least one name-value pair; determining if an input element of a form contains a variable indicating that the input element is enabled for automatic populating, wherein the variable includes a name attribute; and automatically populating the input element of the form using the value in the corresponding name-value pair if the name attribute of the variable corresponds to a name-value pair in the cookie.

9 Claims, 5 Drawing Sheets

METHOD, SYSTEM, AND COMPUTER PROGRAM PRODUCT FOR SHARING INFORMATION BETWEEN HYPERTEXT MARKUP LANGUAGE (HTML) FORMS USING A COOKIE

BACKGROUND OF THE INVENTION

1. Field of the Invention

The present invention generally relates to web forms. More particularly, the present invention provides a method, system, and computer program product for sharing information between HTML forms using a cookie.

2. Related Art

Within a web environment, such as portals, many different types of user interface widgets that take input or state commonly share the same input or state. For example, assume a portal page contains two portlets each of which contains a HyperText Markup Language (HTML) form, and that the HTML forms have duplicate information such as name and address. Currently, a user would enter these fields separately only aided by external utilities such as cut and paste. Although there are a number of techniques to share information between HTML forms, such as explicit beforehand knowledge that two fields in an HTML form are capable of sharing a common value, none of these techniques are abstract enough to facilitate information sharing across independently developed applications that do not have an explicitly prearranged method for sharing data.

Although an "auto-complete" feature is currently available in today's web browsers, it suffers from many problems. For example, it forces a user to choose between many values when filling in a form field (i.e., all the values previously entered in the form field), thus creating an inconvenience for the user. In addition, the values presented by the auto-complete feature for a form field must have been previously entered by a user. Further, a user must start typing in an form field before the auto-complete feature is enabled. Much user intervention is thus required.

SUMMARY OF THE INVENTION

In general, the present invention provides a method, system, and computer program product for sharing information between HTML forms using a cookie. In particular, the present invention provides a hidden form element, namely a Shared Form Variable (SFV), that is used to share similar data between HTML forms. The SFV comprises a name-value pair which is stored in an SFV HyperText Transfer Protocol (HTTP) cookie. A single SFV HyperText Transfer Protocol (HTTP) cookie is used for all SFVs. When input elements of an HTML form sent to a web browser contain an SFV (i.e., the HTML form is "SFV enabled"), the web browser automatically populates the input elements using corresponding name-value pairs stored in the SFV HTTP cookie.

A first aspect of the present invention is directed to a method for automatically populating input elements of a form in a web browser, comprising: providing a cookie containing at least one name-value pair; determining if an input element of the form contains a variable indicating that the input element is enabled for automatic populating, wherein the variable includes a name attribute; and automatically populating the input element of the form using the value in the corresponding name-value pair if the name attribute of the variable corresponds to a name-value pair in the cookie.

A second aspect of the present invention is directed to a system for automatically populating input elements of a form in a web browser, comprising: a system for providing a cookie containing at least one name-value pair; a system for determining if an input element of the form contains a variable indicating that the input element is enabled for automatic populating, wherein the variable includes a name attribute; and a system for automatically populating the input element of the form using the value in the corresponding name-value pair if the name attribute of the variable corresponds to a name-value pair in the cookie.

A third aspect of the present invention is directed to a program product stored on a recordable medium for automatically populating input elements of a form in a web browser, which when executed comprises: program code for providing a cookie containing at least one name-value pair; program code for determining if an input element of the form contains a variable indicating that the input element is enabled for automatic populating, wherein the variable includes a name attribute; and program code for automatically populating the input element of the form using the value in the corresponding name-value pair if the name attribute of the variable corresponds to a name-value pair in the cookie.

A fourth aspect of the present invention is directed to a method for deploying an application for automatically populating input elements of a form in a web browser, comprising: providing a computer infrastructure being operable to: provide a cookie containing at least one name-value pair; determine if an input element of the form contains a variable indicating that the input element is enabled for automatic populating, wherein the variable includes a name attribute; and automatically populate the input element of the form using the value in the corresponding name-value pair if the name attribute of the variable corresponds to a name-value pair in the cookie.

A fifth aspect of the present invention is directed to computer software embodied in a propagated signal for automatically populating input elements of a form in a web browser, the computer software comprising instructions to cause a computer system to perform the following functions: provide a cookie containing at least one name-value pair; determine if an input element of the form contains a variable indicating that the input element is enabled for automatic populating, wherein the variable includes a name attribute; and automatically populate the input element of the form using the value in the corresponding name-value pair if the name attribute of the variable corresponds to a name-value pair in the cookie.

BRIEF DESCRIPTION OF THE DRAWINGS

These and other features of this invention will be more readily understood from the following detailed description of the various aspects of the invention taken in conjunction with the accompanying drawings in which.

Figure 1:
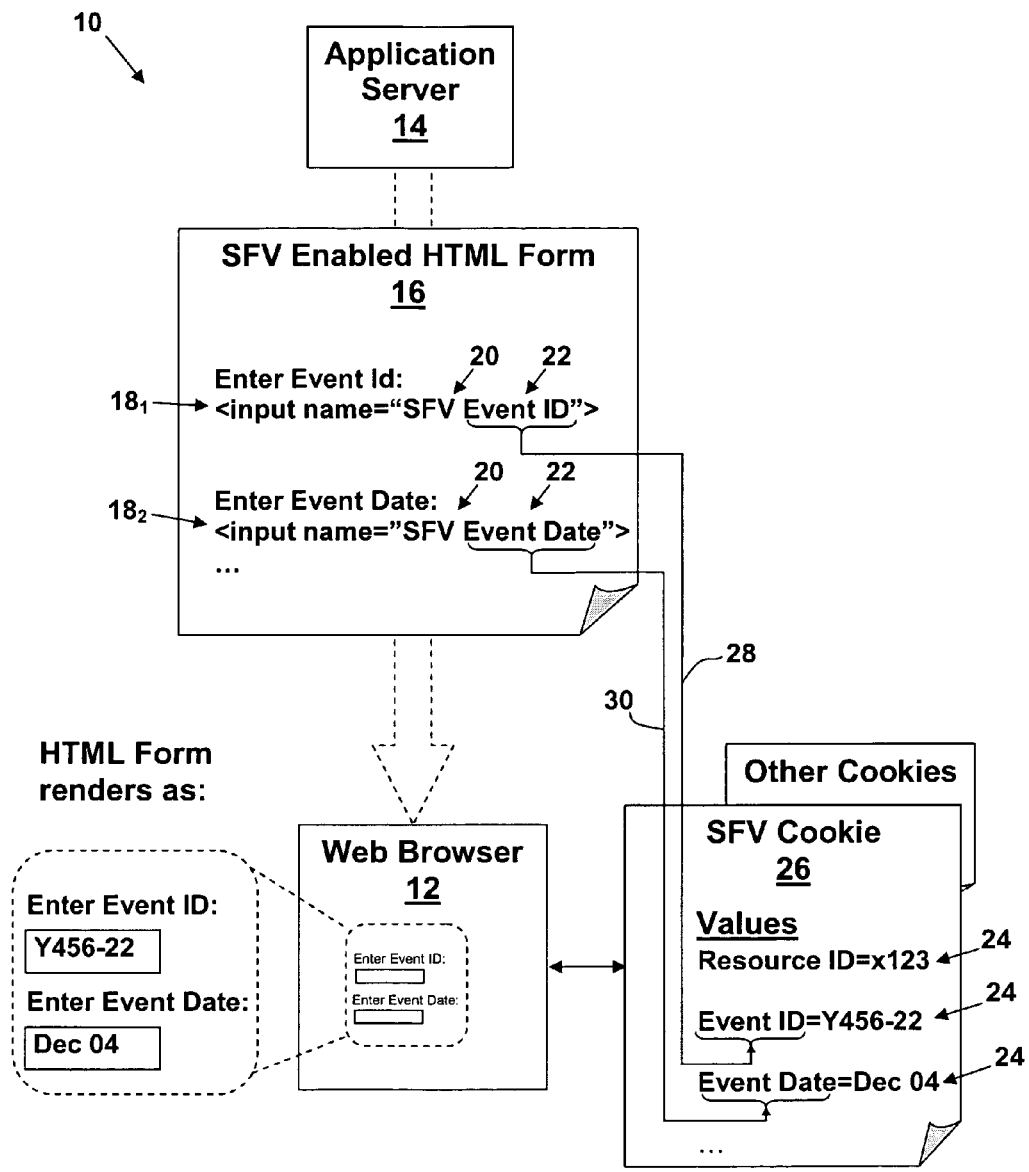
FIG. 1 depicts a system for automatically populating input elements of an HTML form in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for sharing information between HTML forms using a cookie. In particular, the present invention provides a hidden form element, namely a Shared Form Variable (SFV), that is used to share similar data between HTML forms. The SFV comprises a name-value pair which is stored in an SFV HTTP cookie. A single SFV HTTP cookie is used for all SFVs. When input elements of an HTML form sent to a web browser contain an SFV (i.e., the HTML form is "SFV enabled"), the web browser automatically populates the input elements using corresponding name-value pairs stored in the SFV HTTP cookie.

FIG. 1 depicts a system 10 for automatically populating input elements of an HTML form in accordance with an embodiment of the present invention. As shown, system 10 includes a web browser 12 (e.g., running on a client device) and an application server 14 for providing web content to the web browser 12. An HTML form 16 has been sent from the application server 14 to the web browser 12, for example, as part of a web page requested by the web browser 12. In this example, the HTML form 16 includes a plurality of input elements 18 (e.g., input element $18_1$ and input element $18_2$). Input elements $18_1$, $18_2$ each include a keyword 20 ("SFV") indicating that the input elements $18_1$, $18_2$ contain an SFV. Thus, the HTML form 16 is "SFV enabled." Other keywords, attributes, etc., can also be used to identify that an input element 18 in the HTML form 16 contains an SFV. As illustrated in FIG. 1, the SFV in input element $18_1$ has a name attribute 22 of "Event ID," while the SFV in input element $18_2$ has a name attribute 22 of "Event Date."

Upon receipt of the HTML form 16 from the application server 14, the web browser 12 renders the HTML form 16 and examines the HTML form 16 for any input elements 18 containing an SFV. When an input element 18 in the HTML form 16 is found to include an SFV, the value corresponding to the name attribute 22 of the SFV, which is stored in a name-value pair 24 in an SFV HTTP cookie 26, is retrieved and used by the web browser 12 to automatically populate the input element 18. In the HTML form 16, for example, the web browser 12 examines the input element $18_1$, determines that the input element $18_1$ contains a keyword 20 (e.g., "SFV") indicating that the input element $18_1$ contains an SFV, obtains the value "Y456-22" corresponding to the name attribute 22 of the SFV ("Event ID") from the matching name-value pair 24 in the SFV HTTP cookie 26, and populates the HTML form 16 using the obtained value "Y456-22." The matching of the name attribute 22 of the SFV ("Event ID") in the input element $18_1$ and the corresponding name-value pair 24 in the SFV HTTP cookie 26 is represented in FIG. 1 by arrow 28. In a similar manner, the web browser 12 examines input element $18_2$, determines that the input element $18_2$ contains a keyword 20 (e.g., "SFV") indicating that the input element $18_2$ contains an SFV, obtains the value "Dec 04" corresponding to the name attribute 22 of the SFV ("Event Date") from the matching name-value pair 24 in the SFV HTTP cookie 26, and populates the HTML form 16 using the obtained value "Dec 04." The matching of the name attribute 22 of the SFV ("Event Date") in the input element $18_2$ and the corresponding name-value pair 24 in the SFV HTTP cookie 26 is represented in FIG. 1 by arrow 30. The resulting, automatically populated input elements $18_1$, $18_2$ of the HTML form 16 are shown in the lower left section of FIG. 1. This process is repeated for each input element 18 in the HTML form 16. Any input elements 18 not containing an SFV are populated in a conventional manner (e.g., via input by a user).

In the case where a matching name-value pair 24 is not found in the SFV HTTP cookie 24 for a given SFV name attribute 22, a value inputted by a user into the HTML form 16 is used to generate the name-value pair 24. The generated name-value pair 24 is then added to the name-value pairs 24 already present in the SFV HTTP cookie 26. The resultant name-value pair 24 added to the SFV HTTP cookie 26 can then be used to automatically populate HTML form input elements 18 having a corresponding matching SFV name attribute 22.

The above-process can be provided in a JavaScript running on the web browser 12 or using any other suitable method. It is assumed for purposes of this discussion that the reader has an understanding of Java, JavaScripts, web browsers, application servers, cookies, HTML, HTTP, etc. Accordingly, a detailed discussion of these topics will not be provided herein.

Figure 2:
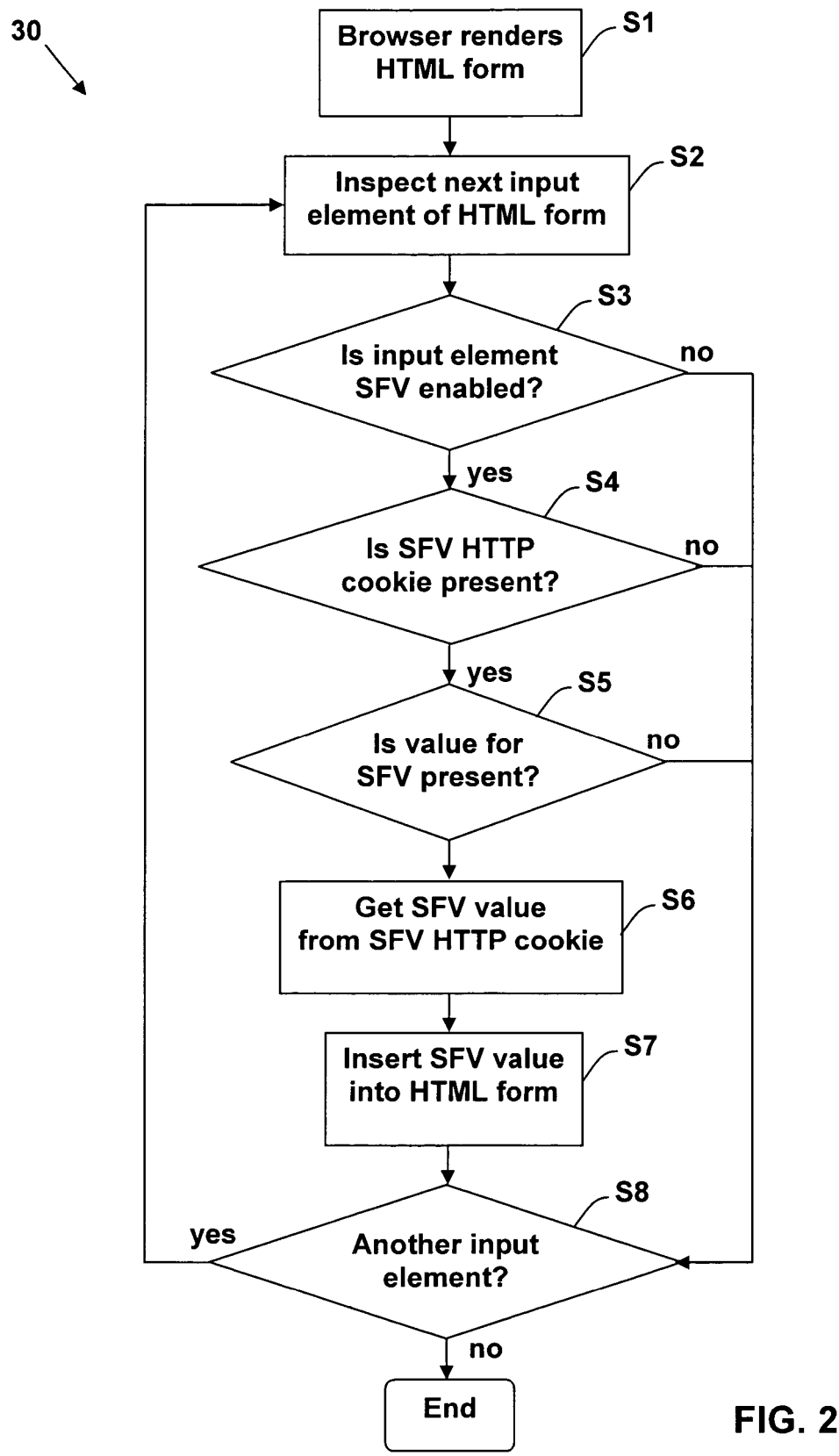
FIG. 2 depicts a flow diagram of a method for automatically populating input elements of an HTML form in accordance with an embodiment of the present invention.

A flow diagram 30 illustrating a method for automatically populating input elements of an HTML form in accordance with an embodiment of the present invention is illustrated in FIG. 2. In the following description of the flow diagram 30, reference will be made to components of the system 10 illustrated in FIG. 1. In step S1, a web browser 12 renders an HTML form 16 received from an application server 14. In step S2, the web browser 12 inspects an input element 18 in the HTML form 16. If the web browser 16 detects a keyword 20 indicating that the input element 18 contains an SFV (step S3), and if an SFV HTTP cookie 26 exists (step S4) and contains a value (step S5) corresponding to the name attribute 22 of the SFV, then flow passes to step S6. Otherwise, flow passes to step S8. In step S6, the value for the SFV is obtained from the SFV HTTP cookie 26 based on the name attribute 22 of the SFV. The obtained value for the SFV is then inserted into the input element 18 of the HTML form 16 (step S7). In step S8, if another input element 18 is present in the HTML form 16, flow is passed back to step S2, otherwise the method ends. Any input elements 18 of the HTML form 16 not containing an SFV (step S3) are populated in a conventional manner (e.g., via input by a user). Any input elements 18 of the HTML form 16 containing an SFV but not having a matching name-value pair 24 in the SFV cookie 26 (step S5) are also populated in a conventional manner.

In accordance with the present invention, SFVs can be shared across a plurality of application servers within the same subnet by scoping the SFV HTTP cookie based on the domain name system (DNS) suffix. A common DNS suffix is specified for the domain property of the SFV HTTP cookie so that a web browser can apply the SFV HTTP cookie to HTML forms originating from any of the application servers.

Figure 3:
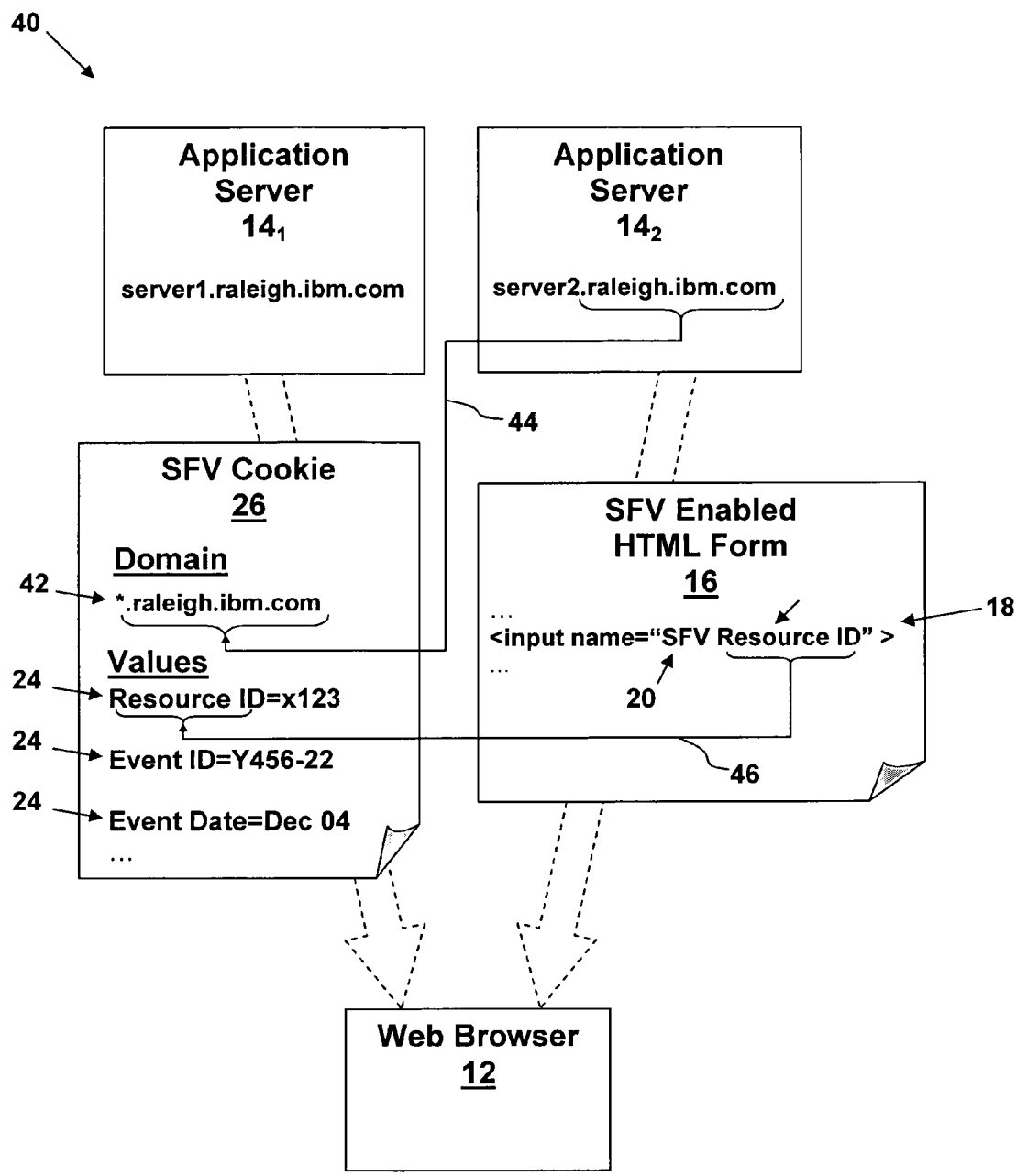
FIG. 3 depicts a system for automatically populating input elements of an HTML form in accordance with another embodiment of the present invention.

As an example, reference is made to the system 40 in FIG. 3, which includes a web browser 12, a first application server $14_1$ ("server1.raleigh.ibm.com") and a second application server $14_2$ ("server2.raleigh.ibm.com"). An SFV enabled HTML form 16 has been sent from the second application server $14_2$ to the web browser 12 (e.g., as part of a web page requested by the web browser 12). As shown, the HTML form 16 includes at least one input element 18 having a keyword 20 ("SFV") indicating that it contains an SFV. The system 40 also includes an SFV HTTP cookie 26 having a DNS suffix 42 "*.raleigh.ibm.com" that allows the SFV HTTP cookie 26 to be shared across application servers within the same subnet (e.g., application server 14₁, application server 14₂).

When filling out the HTML form 16, the web browser 12 examines the input element 18 and determines that the input element 18 contains a keyword 20 (e.g., "SFV") indicating that the input element 18 contains an SFV. The web browser 12 then scopes and accesses the SFV HTTP cookie 26 from application server 14₁ based on the domain name system (DNS) suffix 42 "*.raleigh.ibm.com." This is depicted in FIG. 3 by arrow 44. After obtaining the value "x123" corresponding to the name attribute 22 of the SFV ("Resource ID") from the matching name-value pair 24 in the SFV HTTP cookie 26, the web browser 12 populates the HTML form 16 using the obtained value "x123." The matching of the name attribute 22 of the SFV ("Resource ID") in the input element 18 and the corresponding name-value pair 24 in the SFV HTTP cookie 26 is represented in FIG. 3 by arrow 46.

Figure 4:
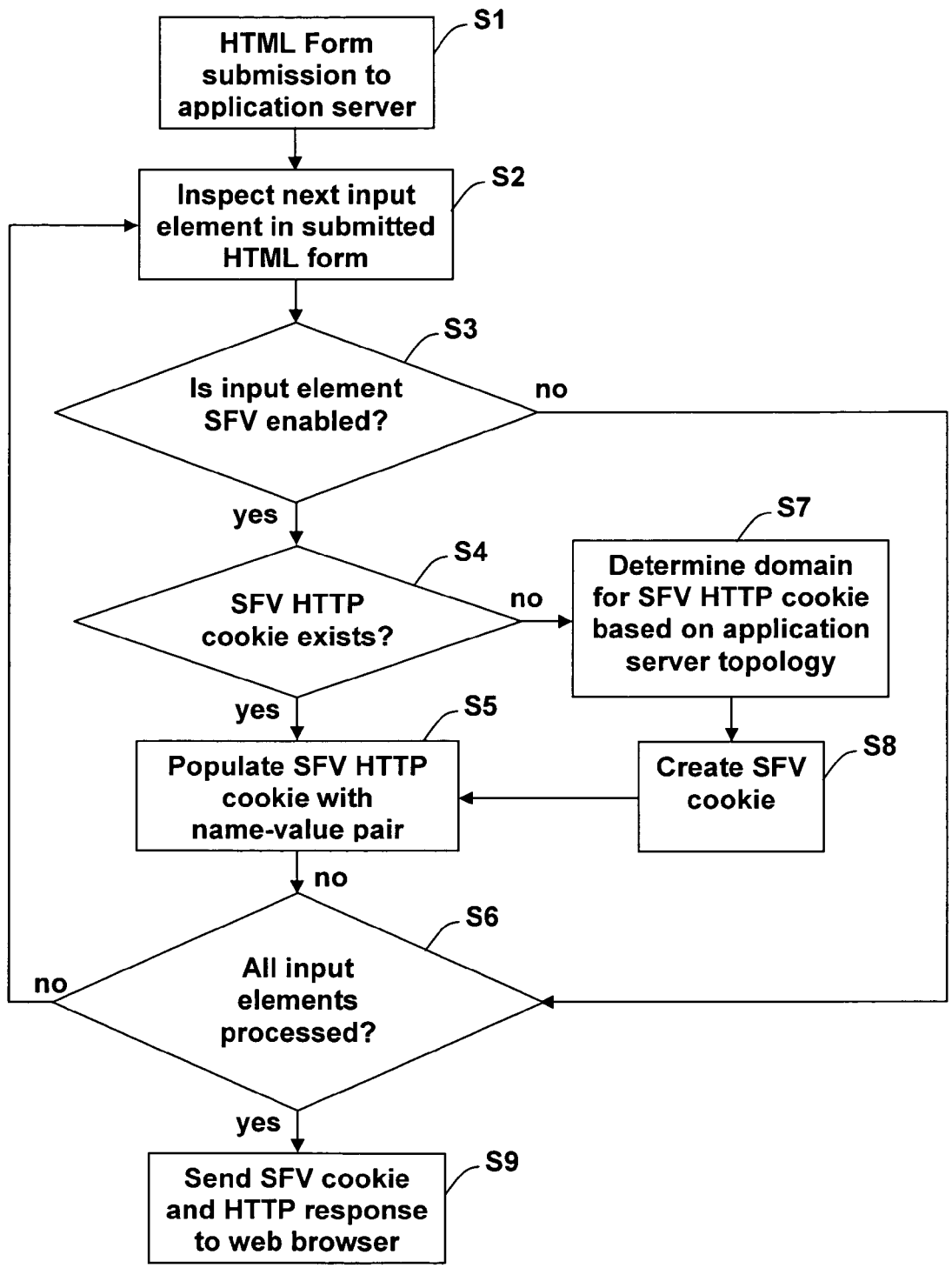
FIG. 4 depicts a flow diagram illustrating how an SFV cookie is created in accordance with an embodiment of the present invention.

A flow diagram 50 illustrating how an SFV HTTP cookie is created in accordance with an embodiment of the present invention is illustrated in FIG. 4. In the following description of the flow diagram 50, reference will be made to various components of the system 10 illustrated in FIG. 1.

In step S1, a completed (i.e., filled in) HTML form 16 is submitted by the web browser 12 to the application server 14. In step S2, the application server 14 inspects an input element 18 in the completed HTML form 16. In step S3, the application server 14 determines if the input element 18 is SFV enabled. This is done by inspecting the input element 18 for a keyword 20 ("SFV") or the like indicating that the input element 18 contains an SFV. If the input element 18 is not SFV enabled, flow passes to step S6. Otherwise, flow passes to step S4, where the application server 14 determines if an SFV HTTP cookie 26 already exists. If an SFV HTTP cookie 26 exists, the application server 14 populates the SFV HTTP cookie 26 with a name-value pair 24 comprising the name attribute 22 of the SFV and the filled in value of the input element 18. Flow then passes to step S6.

If an SFV HTTP cookie 26 does not exist (step S4), the application server 14 determines a domain for the SFV HTTP cookie 26 in step S7 based on application server topology (see, e.g., FIG. 3) and creates an SFV HTTP cookie 26 (step S8). Flow then passes to step S5 where the application server 14 populates the newly created SFV HTTP cookie 26 with a name-value pair 24 comprising the name attribute 22 of the SFV and the filled in value of the input element 18.

If all of the input elements 18 in the completed HTML form 16 have been processed by the application server 14 (step S6), then the application server 14 sends (step S9) the SFV HTTP cookie 26 and HTTP response to the web browser 12. Otherwise flow passes back to step S2.

The present invention provides many advantages over existing techniques for auto-filling form data, including, for example:

(A) The present invention works on any platform that supports HTTP and JavaScript without requiring any separate installation or browser plug-ins.
(B) Use of the present invention does not leave a "footprint" on a client device (e.g., disk space, install/uninstall, etc.).
(C) By using the "Expires" property of cookies, an SFV enabled application can set the name-value pairs in a SFV HTTP cookie to expire after some period of time without any intervention by a user.
(D) SFVs are populated on an application server instead of on a client device. This provides the opportunity to share the name-value pairs in an SFV HTTP cookie between multiple users and multiple hosted applications.
(E) By using the "Domain" property of cookies, the name-value pairs in an SFV HTTP cookie shared among HTML forms can be easily limited to specific domain names (e.g., *.ibm.com).
(F) An SFV HTTP cookie does not have to be maintained outside of an SFV enabled application. Form templates created using prior art techniques require outside maintenance.
(G) Synchronization of an HTML form's input element names can be coordinated by an SFV enabled application without any intervention by a user.
(H) The population of HTML form data using name-value pairs in an SFV HTTP cookie occurs automatically via JavaScript and does not require initiation by, or interaction with, a user. Also, the required JavaScript can be provided to a web browser on a client device by an application server.

Figure 5:
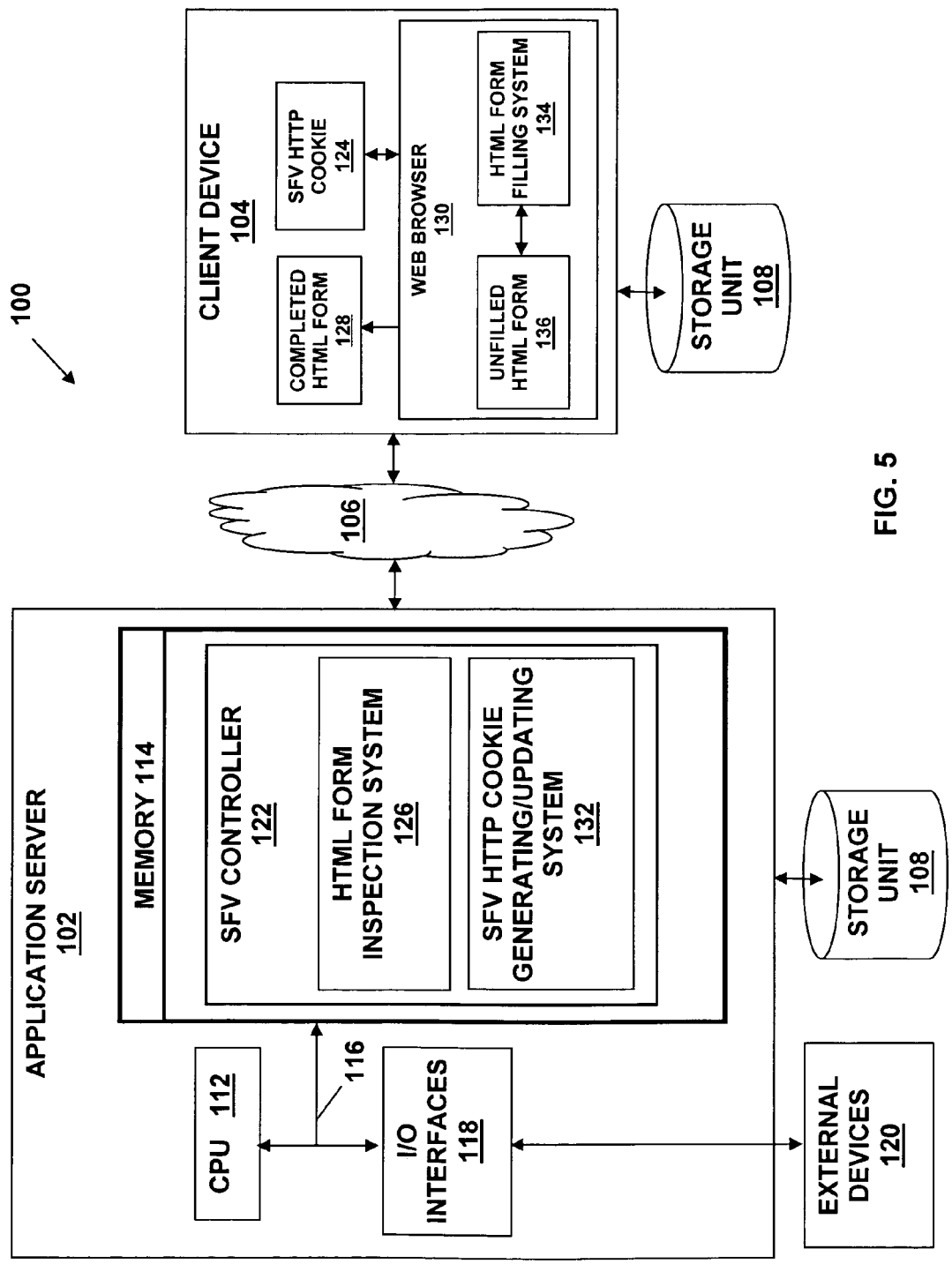
FIG. 5 depicts a computer system for implementing the present invention.

Referring now to FIG. 5, there is illustrated a client-server system 100 for sharing information between HTML forms in accordance with the present invention. The client-server system 100 is intended to represent any type of client-server system 100 capable of implementing the methods of the present invention.

The client server system 100 illustrated in FIG. 5 includes at least one application server 102 and at least one web-enabled client device 104 (e.g., desktop computer, laptop computer, workstation, hand-held device, pager, etc.) connected to the application server 102 over a network 106 such as the Internet.

Data (e.g., web pages, HTML forms, cookies, etc.) required to practice the present invention can be stored locally to application server 102 and/or client device 104 (e.g., in a storage unit 108), and/or may be provided over a network. Each storage unit 108 can comprise any system capable of providing storage for data and information under the present invention. As such, each storage unit 108 may reside at a single physical location, comprising one or more types of data storage, or may be distributed across a plurality of physical systems in various forms. In another embodiment, each storage unit 108 may be distributed across, for example, a local area network (LAN), wide area network (WAN) or a storage area network (SAN) (not shown).

Network 106 is intended to represent any type of network over which data can be transmitted. For example, network 106 can include the Internet, a wide area network (WAN), a local area network (LAN), a virtual private network (VPN), a WiFi network, a personal area network (PAN), or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As shown, application server 102 generally includes a processor 112, memory 114, bus 116, input/output (I/O) interfaces 118 and external devices/resources 120. Client device 104 generally includes similar components (e.g., processor, memory, bus, input/output (I/O) interfaces, and external devices/resources).

Processor 112 may comprise a single processing unit, or may be distributed across one or more processing units in one or more locations, e.g., on a client and server. Memory 114 may comprise any known type of data storage and/or transmission media, including magnetic media, optical media, random access memory (RAM), read-only memory (ROM), etc. Moreover, similar to processor 112, memory 114 may reside at a single physical location, comprising one or more types of data storage, or be distributed across a plurality of physical systems in various forms.

I/O interfaces 118 may comprise any system for exchanging information to/from an external source. External devices/resources 120 may comprise any known type of external device, including speakers, a CRT, LED screen, handheld device, keyboard, mouse, voice recognition system, speech output system, printer, monitor/display, facsimile, pager, etc.

Bus 116 provides a communication link between each of the components in application server 102, and likewise may comprise any known type of transmission link, including electrical, optical, wireless, etc. In addition, although not shown, other components, such as cache memory, communication systems, system software, etc., may be incorporated into application server 102.

Shown in memory 114 is an SFV controller 122, which may be provided as a computer program product. The SFV controller 122 is configured to generate and update the contents of a SFV HTTP cookie 124 for use by client device 104, in accordance with the methods of the present invention. The SFV controller 122 includes an HTML form inspection system 126 for inspecting input elements of a completed HTML form 128 supplied to application server 102 by a web browser 130 running on client device 104. The SFV controller 122 further includes an SFV HTTP cookie generating/updating system 132 for generating/updating the SFV HTTP cookie 124 based on name-value pairs extracted from completed HTML forms (e.g., completed HTML form 128) and for communicating the resultant SFV HTTP cookie 124 to the web browser 130.

Client device 104 includes an HTML form filling system 134 for automatically propagating values into the SFV enabled input elements of an unfilled HTML form 136 based on the name-value pairs currently available in the SFV HTTP cookie 124. Non-enabled input elements in the unfilled HTML form 136 are entered using conventional techniques.

It should be appreciated that the teachings of the present invention can be offered as a business method on a subscription or fee basis. For example, application server 102 could be created, maintained, supported, and/or deployed by a service provider that offers the functions described herein for customers. That is, a service provider could be used to share information between HTML forms using a cookie, as describe above.

It should also be understood that the present invention can be realized in hardware, software, a propagated signal, or any combination thereof. Any kind of computer/server system (s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for automatically populating a plurality of input elements of a form in a web browser, comprising:
   providing a single cookie containing a plurality of name-value pairs, wherein, for each of the plurality of input elements of the form:
      determining if the input element of the form contains a shared form variable indicating that the input element is enabled for automatic populating, wherein the shared form variable includes a name attribute and a keyword indicative of a shared form variable; and
      automatically populating the input element of the form using a value in a corresponding one of the plurality of name-value pairs in the cookie if the name attribute of the shared form variable corresponds to one of the plurality of name-value pairs in the cookie;
   sharing the cookie across a plurality of application servers having a common domain name system (DNS) suffix, wherein the cookie can be applied to forms originating from any of the plurality of application servers;
   wherein each of the plurality of input elements containing a shared form variable includes the same keyword, and wherein the form and the cookie are received by the web browser from an application server.

2. The method of claim 1, further comprising, for each of the plurality of input elements of the form:
   entering a value into the input element of the form if the name attribute of the shared form variable does not correspond to one of the plurality of name-value pairs in the cookie.

3. The method of claim 2, further comprising:
   repeating the method for each input element in the form to provide a completed form.

4. The method of claim 3, further comprising:
   submitting the completed form to an application server.

5. The method of claim 4, further comprising, at the application server:
   for each value entered into an input element of the completed form:
      generating a name-value pair comprising the name attribute of the input element and the entered value; and
      updating the cookie by populating the cookie with the generated name-value pair.

6. The method of claim 5, further comprising:
   sending the cookie to the web browser.

7. The method of claim 1, wherein the form comprises a HyperText Markup Language (HTML) form.

8. The method of claim 1, wherein the cookie comprises a HyperText Transfer Protocol (HTTP) cookie.

9. The method of claim 1, wherein the variable comprises a hidden form element.

* * * * *

UNITED STATES PATENT AND TRADEMARK OFFICE
CERTIFICATE OF CORRECTION

PATENT NO. : 7,617,233 B2
APPLICATION NO. : 10/952120
DATED : November 10, 2009
INVENTOR(S) : Guido et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 495 days.

Signed and Sealed this

Nineteenth Day of October, 2010

David J. Kappos
*Director of the United States Patent and Trademark Office*